United States Patent Office 3,767,669
Patented Oct. 23, 1973

3,767,669
PHENYL-SUBSTITUTED HYDROXYALKYL
DERIVATIVES OF GLYCOLURILS
Chempolil T. Mathew, Dover, N.J., assignor to Allied
Chemical Corporation, New York, N.Y.
No Drawing. Filed June 18, 1971, Ser. No. 154,694
Int. Cl. C07d *49/30*
U.S. Cl. 260—309.7    7 Claims

ABSTRACT OF THE DISCLOSURE

Phenyl-substituted oxyalkylated derivatives of glycolurils are prepared by reaction of glycolurils with 1 to 3 mols of styrene oxide per mol of glycoluril in the presence of a suitable catalyst. These compounds are useful lubricants and intermediates to prepare polyurethanes, polyesters, alkyd resins and surface active agents.

---

This invention relates to novel phenyl-substituted derivatives of glycoluril and 3a- and/or 6a-substituted glycolurils. More particularly, this invention relates to phenyl-substituted-hydroxyalkyl derivatives of glycoluril and 7- and/or 8-substituted glycolurils and methods for preparing them.

SUMMARY OF THE INVENTION

The compounds of the invention have the formula

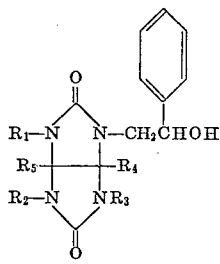

wherein $R_1$, $R_2$ and $R_3$ can be hydrogen or 2-phenyl-2-hydroxyethyl with the proviso that at least one of $R_1$, $R_2$ and $R_3$ is hydrogen, and $R_4$ and $R_5$ independently can be hydrogen, alkyl, aryl, alkaryl or aralkyl of up to 8 carbon atoms. The compounds most preferred in the invention are those wherein $R_4$ and $R_5$ are selected from the group consisting of hydrogen and methyl.

These compounds are prepared by reacting glycoluril or its 3a- and/or 6a-substituted derivatives with one, two or three mols of styrene oxide in the presence of a suitable catalyst. They are useful as lubricants and to prepare surface active agents. The diols and triols are also suitable for the preparation of polymers, such as saturated or unsaturated polyesters and polyurethanes.

DETAILED DESCRIPTION OF THE INVENTION

The compounds of the invention are prepared by reacting a glycoluril of the formula

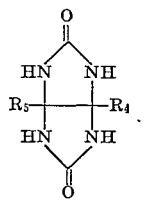

wherein $R_5$ and $R_5$ have the meanings given above, with one, two or three mols of styrene oxide in the presence of a catalyst, at elevated temperatures and pressures.

It was discovered that the nitrogen atoms of the above-described glycolurils add styrene oxide sequentially. This was highly unexpected and surprising in view of the fact that these glycolurils add other 1,2-epoxides, such as ethylene oxide or propylene oxide for example, such that essentially only tetra-substituted products are obtained.

In the present process, addition of one mol of styrene oxide to glycoluril produces almost pure mono-(2-phenyl-2-hydroxyethyl)glycoluril, addition of two mols of styrene oxide to glycoluril produces the bis-substituted compound and addition of three mols of styrene oxide to glycoluril produces the tris-substituted compound.

The reaction is preferably carried out in the presence of a solvent. The solvent must be inert to the reactants, should be a solvent for the product and preferably is a liquid under the reaction conditions. Suitable solvents include dimethylformamide, dioxane and the like.

The temperature of the reaction should be at least 50° C. in order to promote an economic rate of reaction, but higher temperatures, preferably 100° C. up to about 150° C. or higher can be employed. Atmospheric and autogenous pressures can be employed in a closed system but preferably higher pressures, up to about 500 p.s.i., are employed by addition of an inert gas such as nitrogen, argon, carbon dioxide and the like.

The reaction is carried out in the presence of a catalyst. Suitable catalysts include alkali metal hydroxides, such as potassium hydroxide, sodium hydroxide, and the like; ammonia; and tetraorganoammonium halides, such as tetramethylammonium chloride, benzyltrimethylammonium chloride, tetraethylammonium chloride, benzyltriethylammonium chloride and the like. From 0.1 to 15% by weight of the glycoluril reactant, preferably 1 to 6% by weight, of the catalyst is generally employed.

When the reaction is complete, the solution containing the product is filtered to remove the catalyst and the solvent is removed. This can be done in conventional manner, as by evaporation or distillation.

The compounds of the invention are useful as lubricants and to prepare surface active agents. The diols and triols are also useful as monomers to prepare polyesters, polyurethanes and the like, as will be known to one skilled in the art.

Polyurethanes are prepared by reacting a polyol with a polyisocyanate in accordance with well-known procedures. The polyol compounds of the invention can be employed as the sole polyol component or in admixture with conventional polyols in the presence of conventional additives, including blowing agents, activators, catalysts, emulsifiers, fillers and the like. Rigid, fine celled foams can be prepared readily by the one-shot technique whereby a gas former, such as a volatile fluorocarbon is added to the polyol and other ingredients and stirred into the polyisocyanate component.

The invention will be further illustrated by the following examples, but it is to be understood that the invention is not meant to be limited by the details disclosed therein. In the examples, parts and percentages are by weight unless otherwise noted. It is to be understood that the structures are illustrative and, when appropriate, position isomers are equivalent.

EXAMPLE 1

A mixture of 7.8 parts of 3a-methylglycoluril, 0.506 part of tetramethylammonium chloride and 100 parts by volume of dimethylformamide was charged to a stainless steel autoclave. The autoclave was flushed with nitrogen and 6.8 parts of styrene oxide added. The autoclave was closed and heated to 100° C. while stirring. Pressure was maintained between 125–130 p.s.i. with nitrogen and reaction continued for 24 hours. The reactor was cooled and the reaction product filtered. The resultant clear, colorless solution was evaporated to dryness.

The product, N - (2-phenyl-2-hydroxyethyl)-3a-methylglycoluril having the formula

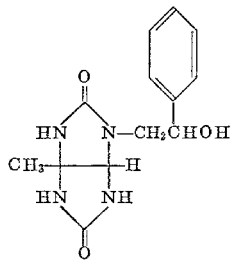

was obtained in almost quantitative yield (13.5 parts) as a yellow, glassy solid having a melting point of 91–95° C.

Elemental analysis was as follows: Calculated for $C_{13}H_{16}N_4O_3$: C, 56.22; H, 5.80; N, 20.29. Found: C, 57.44; H, 6.73; N, 17.70.

The structure was confirmed by infrared and nuclear magnetic resonance analyses.

One tenth mol of the product prepared as above is admixed with a small amount of potassium hydroxide, charged to an autoclave and heated to about 100° C. One mol of propylene oxide is added and reaction continued for about 20 hours. The product is a useful additive to lower the surface tension of water and aqueous solutions.

EXAMPLE 2

The procedure of Example 1 was followed except adding 13.5 parts of styrene oxide. Total reaction time was 26 hours. The product, N,N'-bis-(2-phenyl-2-hydroxyethyl)-3a-methylglycoluril having the formula

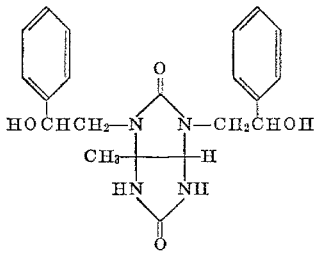

was obtained in almost quantitative yield (21.0 parts) as a brown, glassy solid having a melting point of 68–71° C.

Elemental analysis was as follows: Calculated for $C_{21}H_{24}N_4O_4$: C, 63.64; H, 6.06; N, 14.14. Found: C, 61.97; H, 6.51; N, 14.73.

The structure was confirmed by infrared and nuclear magnetic resonance analyses.

EXAMPLE 3

The procedure of Example 1 was followed except employing 3.9 parts of 3a-methylglycoluril, 0.205 part of tetramethylammonium chloride, 50 parts by volume of dimethylformamide and 12.0 parts of styrene oxide. Total reaction time was 22 hours.

The product, N,N',N''-tris-(2-phenyl-2-hydroxyethyl)-3a-methylglycoluril having the formula

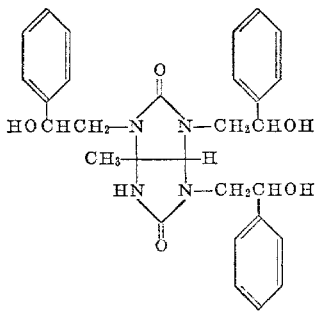

was obtained in almost quantitative yield (12.6 parts) as an orange-yellow solid having a melting point of 72–75° C.

Elemental analysis was as follows: Calculated for $C_{29}H_{32}N_4O_5$: C, 67.74; H, 6.20; N, 10.85. Found: C, 65.70; H, 6.44; N, 11.26.

The structure was confirmed by infrared and nuclear magnetic resonance analyses.

EXAMPLE 4

The procedure of Example 2 is followed substituting an equimolar amount of glycoluril for 3a-methylglycoluril. The product is N,N' - bis-(2-phenyl-2-hydroxyethyl)glycoluril having the formula

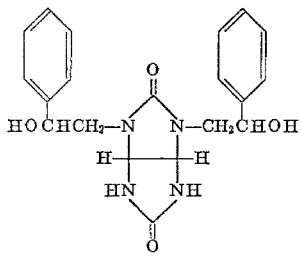

EXAMPLE 5

The procedure of Example 2 is followed substituting an equimolar amount of 3a,6a - dimethylglycoluril for 3a-methylglycoluril. The product is N,N'-bis-(2-phenyl-2-hydroxyethyl)-3a,6a-dimethylglycoluril having the formula

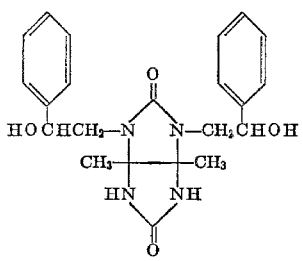

EXAMPLE 6

A rigid polyurethane foam is prepared from 100 parts of N,N'-bis - (2 - phenyl-2-hydroxyethyl)-3a-methylglycoluril prepared as in Example 2, 30 parts of fluorotrichloromethane, 1.5 parts of N-ethylmorpholine, 2 parts of a silicone surfactant (available as Dow Corning 193 from Dow Corning Corporation), 0.1 part of a stannous-type catalyst having 28–29% of tin (available as T-9 from M & T Chemicals Inc.) and 165 parts of a polymethylenepolyphenylisocyanate mixture containing 31% NCO (available as PAPI from the Upjohn Company). All the other ingredients are mixed together rapidly and added to the isocyanate while stirring and pouring into a mold. A rigid, fine celled foam is obtained.

EXAMPLE 7

This example is given for purposes of demonstrating that an alkylene oxide cannot be substituted for styrene oxide in the present process to prepare analogous compounds.

A mixture of 103 parts of 3a-methylglycoluril, 13 parts of sodium hydroxide and 600 parts by volume of dimethylformamide was charged to an autoclave flushed with nitrogen and heated to 80° C. Sixty parts of ethylene oxide were added with nitrogen so as to maintain the pressure at about 120 p.s.i. After 24 hours the mixture was cooled and filtered. About 50 parts of a white solid were collected and identified as unreacted 7-methylglycoluril. The filtrate was concentrated under vacuum. A very viscous, amber colored product was obtained.

Elemental analysis found for the product was C, 45.93; H, 7.15; N, 17.21. Theoretical for N,N',N'',N'''-tetrakis (2-hydroxyethyl)-3a-methylglycoluril is C, 46.98; H, 7.23; N, 16.87 ($C_{13}H_{24}N_4O_6$).

Infrared and nuclear magnetic resonance analyses were consistant with the tetra-substituted product and not the desired bis-substituted product.

I claim:
1. A compound of the formula

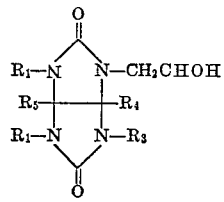

wherein $R_1$, $R_2$ and $R_3$ ca be hydrogen or 2-phenyl-2-hydroxyethyl with the proviso that at least one of $R_1$, $R_2$ and $R_3$ is hydrogen, and $R_4$ and $R_5$ independently are selected from the group consisting of hydrogen, alkyl, aryl, alkaryl and aralkyl of up to 8 carbon atoms.

2. A compound according to claim 1 wherein $R_3$ and $R_4$ are selected from the group consisting of hydrogen and methyl.

3. A compound according to claim 1 of the formula

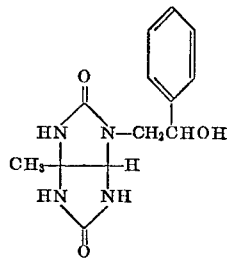

4. A compound according to claim 1 of the formula

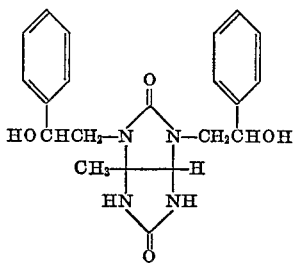

5. A compound according to claim 1 of the formula

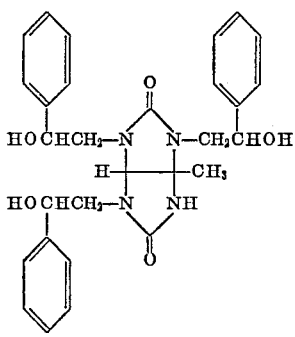

6. A compound according to claim 1 of the formula

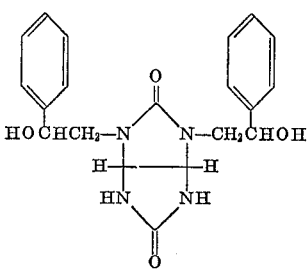

7. A compound according to claim 1 of the formula

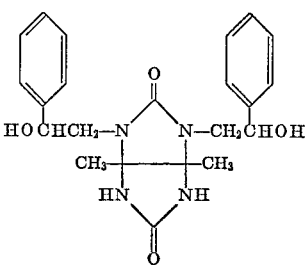

References Cited

UNITED STATES PATENTS 2,548,652  4/1951  Cheney _____ 260—570.5

FOREIGN PATENTS

B36,767  9/1956  Germany _____ 260—309.7

OTHER REFERENCES

Chemical Abstracts Subject Index (A–I), vol. 67, p. 1605S (July-December 1967).

Rosowsky In: Weissberger Heterocyclic Compounds with Three- and Four-Membered Rings, Part 1, pp. 320–1, N.Y., Interscience, Wiley, 1964.

Union Carbide Chemicals Co., Peracetic Acid and Derivatives, p. 36, Union Carbide Chemicals Co., 1957.

Becco Bulletin No. 69, Epoxidation and Hydroxylation with Becco Hydrogen Peroxide and Peracetic Acid, p. 42, Buffalo, N.Y., Becco Chemical Division Food Machinery & Chemical Corp., 1956.

Emerson J.: Amer. Chem. Soc., vol. 67, pp. 516–8 (1945).

Chapman et al.: J. Chem. Soc. (London), 1959, pp. 1925–34.

Kakurai et al.: Chem. Abst., vol. 54, column 17945 (1960).

Badische Anilin & soda-Fabrik., Chem. Abst., vol. 65, columns 9134–5 (1966).

Bennewitz et al.: Chem. Abst., vol. 68, No. 60415c (1968).

O'Brien: Amer. Dyestuff Reporter, vol. 54, No. 13, pp. 46–52 (June 21, 1965).

NATALIE TROUSOF, Primary Examiner

U.S. Cl. X.R.

252—50; 260—2.5 A, 2.5 AQ, 75 N, 77.5 AQ, 77.5 C, 77.5 MH

UNITED STATES PATENT OFFICE
CERTIFICATE OF CORRECTION

Patent No. 3,767,669  Dated October 23, 1973

Inventor(s) Chempolil T. Mathew

It is certified that error appears in the above-identified patent and that said Letters Patent are hereby corrected as shown below:

Column 1, line 23, "7- and/or 8-substituted" should be --3a- and/or 6a-substituted--

Column 1, line 43, "up to 8" should read --1 to 8--

Column 1, line 68, "$R_5$", first occurrence, should read --$R_4$--

Claim 1, the formula

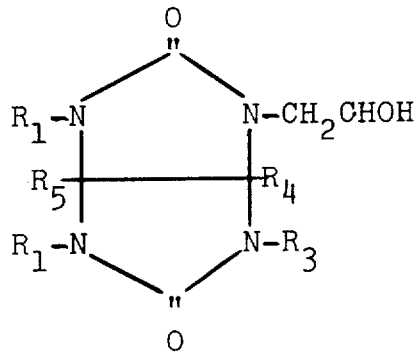

should read

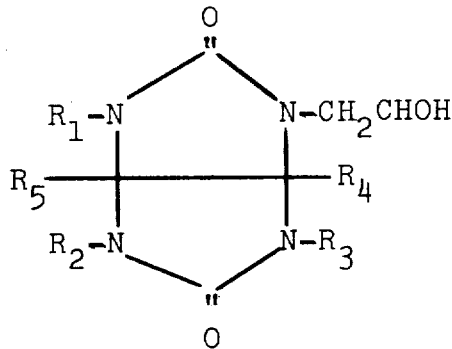

PO-1050
(5/69)

UNITED STATES PATENT OFFICE
CERTIFICATE OF CORRECTION

Patent No. 3,767,669                    Dated October 23, 1973

Inventor(s) Chempolil T. Mathew

It is certified that error appears in the above-identified patent and that said Letters Patent are hereby corrected as shown below:

Claim 1, first line after the formula, "ca" should be --can--

Claim 1, last two lines, "Hydrogen, alkyl, aryl, alkaryl and aralkyl of up to 8 carbon atoms." should read --hydrogen and alkyl, of up to 8 carbon atoms.--.

Signed and sealed this 9th day of July 1974.

(SEAL)
Attest:

McCOY M. GIBSON, JR.                    C. MARSHALL DANN
Attesting Officer                       Commissioner of Patents